United States Patent [19]

Winston et al.

[11] 3,948,325

[45] Apr. 6, 1976

[54] FRACTURING OF SUBSURFACE FORMATIONS WITH BINGHAM PLASTIC FLUIDS

[75] Inventors: Fred F. Winston, Tulsa; Julius C. Carver, Oklahoma City, both of Okla.

[73] Assignee: The Western Company of North America, Fort Worth, Tex.

[22] Filed: Apr. 3, 1975

[21] Appl. No.: 564,989

[52] U.S. Cl. ................................ 166/308; 166/307
[51] Int. Cl.² ..................... E21B 43/26; E21B 43/27
[58] Field of Search .......... 166/308, 307, 281, 282, 166/283, 259, 271; 252/8.55 A

[56] References Cited
UNITED STATES PATENTS

| | | | |
|---|---|---|---|
| 2,965,172 | 12/1960 | Da Roza | 166/308 |
| 3,096,284 | 7/1963 | Slate | 166/283 |
| 3,163,219 | 12/1964 | Wyant et al. | 166/283 |
| 3,179,172 | 4/1965 | Reed et al. | 166/283 |
| 3,378,073 | 4/1968 | Savins | 166/308 |
| 3,378,074 | 4/1968 | Kiel | 166/308 |
| 3,475,334 | 10/1969 | Boudreaux | 166/308 X |
| 3,592,266 | 7/1971 | Tinsley | 166/308 X |
| 3,727,688 | 4/1973 | Clampitt | 166/308 X |
| 3,766,986 | 10/1973 | Kiel | 166/308 |
| 3,888,312 | 6/1975 | Tiner et al. | 166/308 |

*Primary Examiner*—Stephen J. Novosad
*Attorney, Agent, or Firm*—Richards, Harris & Medlock

[57] ABSTRACT

A method of increasing the permeability of a subsurface formation by the utilization of a Bingham plastic fracture fluid. The Bingham plastic fracture fluid is pumped into a preformed fracture or a fracture formed with the Bingham plastic fluid and hydraulic pressure is imparted to the formation which is greater than that which was required to initially fracture the formation (i.e., the formation is overpressurized) by either (1) relieving the pumping pressure on the Bingham plastic fluid in the fracture and allowing the fracture to heal and thereafter reapplying the pumping pressure on the Bingham plastic fluid in an increased amount, e.g., an amount sufficient to move the Bingham plastic fluid in the fracture; or (2) continuing pumping of the Bingham plastic fluid into the fracture such that the friction drop caused by the continued pumping results in such increase in pressure.

34 Claims, No Drawings

FRACTURING OF SUBSURFACE FORMATIONS WITH BINGHAM PLASTIC FLUIDS

BACKGROUND OF THE INVENTION

This invention relates to the stimulation of oil and gas wells. In another aspect, this invention relates to a novel method of hydraulically fracturing subsurface formations.

Most oil and gas naturally occurs within porous underground rock formations, and production wells are drilled directly into such natural formations. However, before such a well becomes economically feasible, the well bore itself must connect with existing natural permeability or flow channels or artificially made flow channels for the reservoir fluids. Well stimulation normally involves the treating of such oil and gas containing formations in a manner which will increase the ability of the formation rock to conduct fluid into the well.

Many techniques have been developed for hydraulically fracturing formations traversed by a well bore in order to increase the productivity of such formations. The technique of hydraulic fracturing includes applying fluid pressure to exposed formation rock until failure occurs. After a fracture is formed, the continued application of fluid pressure extends such fracture outward from the point of failure. In some cases, the opening of one or more flow channels or fractures, will in itself greatly increase the permeability of the formation. However, in the majority of treatments, it is also necessary to deposit a propping agent in the open fracture in order to prevent it from closing off by the natural overburden pressure and thereby substantially reducing the advantage gained by the initial opening of the fracture.

Various fracture fluids have been developed not only to transmit the hydraulic fracture pressure into the formation but also to transport propping agents such as sand and the like into the formation. Conventionally such fracture fluids are either Newtonian type natural fluids such as water or oil, or viscous low friction drop fluids such as pseudoplastic fluids or pseudoplastic thixotropic fluids. The latter types of fluids have often been utilized as the fracture fluids containing propping agent because they are capable of suspending and carrying the proppant and will yield high apparent viscosities at low shear rates in laminar flow and their use will not result in high friction losses during the pumping and fracturing operation.

Generally, the conventional fracture fluid when pumped into the formation will follow the course of least resistance and thus either widen existing fractures or open the most easily fracturable incipient fracture(s), and in general cause failure of the weakest part of the formation rock adjacent the well bore. This action can be undesirable where large accumulations of oil and gas or fractures communicating with such accumulations are positioned parallel to existing fractures in the formation which communicate with the well bore, or in situations where such accumulations are positioned within or beyond a zone which is difficult to fracture. Various techniques have been utilized in an attempt to divert the fracture fluid from the more permeable portions of the formation into the least permeable portions of the formation. Typically, the more permeable zones have been blocked with a build-up of solids, or a settable fluid which is pumped into the more permeable opening and then allowed to cure. Other techniques have been utilized to seal more permeable portions of the formation but all these techniques suffer from the drawback of only sealing the area adjacent the intersection of the more permeable portion and the well bore and continued pumping of the fracture fluid usually results in a diversion of the fracture fluid around the intersection block and back into the more permeable zone. Therefore, little, if any, fracturing will occur in other areas of the formation.

SUMMARY OF THE INVENTION

According to the invention, a novel fracturing method is provided whereby the fracture fluid is pumped into a formation which comprises a Bingham plastic fluid in a manner to result in a pressure being imparted to said formation which is greater than that pressure required to fracture the more permeable portions of the formation adjacent the well bore.

In accordance with the preferred method of the subject invention, a Bingham plastic fluid is pumped into a fracture within a subsurface formation and thereafter pumping pressure is relieved and pumping movement of said Bingham plastic fluid is stopped such that the pressure in the fracture becomes less than the closure stress of the formation. Next, the pumping pressure is reapplied on said Bingham plastic fluid within said fracture of sufficient intensity to impart a pressure to the formation which is greater than the pressure which was required to initially open or extend the fracture containing said Bingham plastic fluid.

According to another embodiment of the subject invention a Bingham plastic fluid is continuously pumped into a fractured formation at increasing pressures caused by the friction loss of said Bingham plastic fluid until a pumping pressure in excess of the fracture pressure which was required to initially fracture said formation is obtained, and thereafter maintaining the pumping pressure on said Bingham plastic fluid in the formation to result in fracturing and increase of permeability therewithin.

DETAILED DESCRIPTION OF THE INVENTION

Bingham plastic fluids are a type of non-Newtonian fluid and have not been heretofore accepted as fracture fluids within subsurface formations because unlike Newtonian fluids, or other types of non-Newtonian fluids, a finite shear stress is required to start the flow of a Bingham plastic fluid. This finite shear stress is known as its yield point. Thus, a Bingham plastic fluid will not flow until the applied shear stress exceeds the yield point. After the yield point has been exceeded, equal increments of additional shear stress will produce equal increments of a shear rate in proportion to the plastic viscosity of the fluid. In essence, when pumping a Bingham plastic fluid (1) a certain minimum stress must be applied to the Bingham plastic fluid before it will move, and (2) high friction losses occur during pumping. In contrast to Bingham plastic fluids, Newtonian fluids have a direct proportionality between shear stress and shear rate and are used quite widely in fracturing operations. Non-Newtonian fluids aside from Bingham plastic fluids do not have yield points but their apparent viscosity is some non-linear function of shear stress and possibly duration of shear. Such other non-Newtonian fluids are classified as either pseudoplastic fluids or dilatant fluids. The apparent viscosity of a pseudoplastic fluid will decrease with increasing values of shear, and therefore they are used quite commonly as fracture fluids and as sand carrying fracture fluids. A dilatant fluid displays rheological behavior opposite to that of pseudoplastic in that its apparent viscosity increases with increasing shear stress.

Thus, generally, only Newtonian fluids and pseudoplastic fluids are conventionally utilized as fracture fluids within subsurface formations. Any fluid which would result in a high pumping pressure due to high friction losses has been avoided because of the fear of rupturing tubular goods and not being able to displace the fluid a sufficient distance into the formation. Applicants on the other hand have discovered that the characteristic yield point of the Bingham fluid and resulting higher friction pressures when pumping the Bingham fluid can be advantageously utilized in the fracturing operation to increase the permeability of the subsurface formation. In general, any fluid which displays the flow characteristics of a Bingham plastic and is capable of being converted to a relatively non viscous Newtonian fluid in the formation and is compatible with the formation and well treating environment can be used in the scope of the subject invention.

In the preferred mode of carrying out the invention, the subsurface formation can be either initially fractured using a conventional fracture fluid or a Bingham plastic fluid or it can contain natural fractures. It is noted that in carrying out this preferred embodiment of the subject invention, the Bingham plastic fluid is preferably preceded by a stage of conventional fracture fluid such as a natural fluid, e.g., water or petroleum, or a pseudoplastic fracture fluid, and then followed by a stage of any other suitable hydraulic fluid, e.g., a Newtonian or pseudoplastic fracture fluid. In addition, one or more stages of the Bingham plastic fracture fluid can be pumped into the formation in accordance with the preferred embodiment of the subject invention. It is generally preferred that one or more slugs of the Bingham plastic fluid be carried between either Newtonian or pseudoplastic fluids conventionally used in fracturing operations.

The Bingham plastic fluid is pumped into the existing fracture a substantial distance into the formation, e.g., 50 to 500 feet. The pumping can be continued even after the natural fracture pressure of the formation is exceeded. Thereafter, the pumping is stopped and the pressure on the Bingham plastic fluid is relieved such that no pumping movement is imparted to the Bingham plastic fluid. Preferably at this point the externally applied pressure is less than the natural closure pressure of the formation, which will thereby allow the fracture to narrow or close. Thus, it is preferred that the pumping pressure on the Bingham plastic fluid within the fracture be fully relieved such that the natural closure pressure of the formation and the pressure in the fracture will self equalize. After this step, pumping pressure on the Bingham plastic fluid is increased to a point which may or may not cause the Bingham plastic fluid to move within the fracture but will result in an "overpressure" on the formation. Generally, an overpressure on a formation is a pressure which exceeds a normal fracture pressure of the formation (the pressure required to form the fracture or fractures containing the Bingham plastic fluid). This overpressure on the formation will be transmitted to the lessor permeable and impermeable portions of the formation which communicate with the well bore as well as the fracture containing the Bingham plastic fluid and result in increased permeability within the formation. This increased permeability can be due to the opening of incipient fractures within the formation as well as the extension of the fracture(s) which contains the Bingham plastic fluid. Furthermore, since the Bingham plastic fluid extends a substantial distance within the fracture or fractures, the overpressure will not result in a short bypass of fracture fluid back into the fractures containing the Bingham plastic fluid. If such bypass occurs, the fracture fluid must bypass the entire slug of Bingham plastic fluid within the fracture or fractures thereby substantially increasing permeability of the formation. Next, the Bingham plastic fluid is allowed to break and flow back into the well bore. As will be discussed hereinbelow, Bingham plastic fluid used within the scope of the subject invention can comprise certain gels with internal breakers and/or emulsions which break in the reservoir. Furthermore, the preferred Bingham plastic fluids of the subject invention contain solids as weighting agents which also function as propping agents after the viscosity of the fluid has been broken by the breaker.

As stated above, any Bingham plastic which is compatible with the formation and the well treating environment and can be degraded within the formation can be used in the scope of the subject invention. In addition, the type and quantity of the Bingham plastic fluid slug or slugs used in the fracturing operation can be easily designed to create the desired overpressure within any particular formation. This overpressure is generally caused by the pressure drop of the Bingham fluid within the fracture or slot within the formation and can be illustrated generally as follows:

$$\Delta p_f = \frac{\mu_p L V}{4000\ W^2} + \frac{\tau_y L}{400\ W}$$

which is the conventional slot flow formula for Bingham plastics wherein:

$\Delta p_f$ = the friction drop in the slot
   (the overpressure in the formation - psc)
$V$ = velocity of the Bingham plastic fluid (ft./sec.)
$W$ = slot width (in.)
$\tau_y$ = yield point of the Bingham plastic fluid
   (lbs./100 ft.$^2$)
$\mu_p$ = plastic viscosity of the Bingham plastic
   fluid (centipoise)
$L$ = length of Bingham plastic fluid in fracture
   (ft.)

Thus when operating in accordance with the preferred embodiment of the subject invention, after the flow of the Bingham plastic fluid has stopped within the fracture the first function on the righthand side of the formula goes to 0 since the velocity of the fluid is 0. Furthermore, W decreases to a value representative of the healed fracture width since the closure stress or pressure of the formation reduces the Width of the fracture. Furthermore, the closing of the fracture results in an increased value for the length of the fluid. Thus, when pumping is again continued and pressure is increased to the point to cause movement of the Bingham plastic fluid, the resulting overpressure of the formation is equal to yield point of the Bingham plastic times the total length of the plug divided by 400 times the healed fracture width.

Generally, the length of the slug of Bingham plastic fluid can vary as desired, and will depend upon the type of Bingham plastic utilized, the depth of the well, the type of formation and the strength of the piping. Convenient lengths heretofore used range from about 50 to about 500 feet. Furthermore, knowing the efficiency or leak off for any one Bingham plastic fluid, the total volume to be pumped is easily calculated by those of ordinary skill in the art.

In accordance with another embodiment of the subject invention, the Bingham plastic fluid is pumped into a naturally occurring fracture or a fracture which was initially made by the Bingham plastic fluid or by another fracture fluid, and the pumping of the Bingham plastic fluid into the fracture is continued as the pressure drop of the Bingham plastic fluid in the fracture increases and the total fracture pressure increases to a point where the formation is overpressurized, i.e., pressure on the formation exceeds the original fracture pressure of the formation. This pumping pressure is continued until additional fracturing of the formation occurs. After this, the Bingham plastic fluid is allowed to break and flow back into the well bore. In this embodiment, as in the preferred embodiment, it is preferred that a stage of conventional fracture fluid such as Newtonian or pseudoplastic fluid precede the Bingham plastic slug and that a stage of conventional fracture fluid follow the slug of the Bingham plastic fluid. One or more slugs of the Bingham plastic fluid can be utilized in accordance with this embodiment. The length of the Bingham plastic fluid slug can vary with the particular type of fluid, the formation and the strength of the piping equipment but is preferably selected to penetrate into the formation a maximum distance before the overpressure of the formation results. It must be noted, however, as with the preferred embodiment set forth above, it is desirable to stop the pumping within a few hundred feet after the Bingham is forced into the fracture(s) in order to maintain a relatively good interface between the Bingham plastic fluid and the adjacent staged fluids to prevent overriding and fingering and the like which will dilute the Bingham plastic fluid. Therefore, the mobility ratio between the staged fluids should preferably be as compatible as possible.

The most preferred Bingham plastic fluids utilized in the scope of this invention are those made from gelled and complexed natural polyorganic compounds such as guar gum or locust bean gum or chemically modified natural polyorganic gums such as hydroxy propyl guar gum and the like in an aqueous carrier. Such materials are complexed with borate ions in a sufficient quantity to form a viscous fluid having Bingham plastic characteristics. Examples of such Bingham plastics including from 40 to 100 lbs. of guar gum and/or locust bean gum and/or derivatives thereof per 1000 gallons of water and 2 to 50 lbs. of $(NH_4)_2B_4O_7 \cdot 4H_2O$ per 1000 gallons of water. The most preferred Bingham plastic fluids comprise from about 60 to about 80 lbs. of guar gum and about 6 to about 10 lbs. of $(NH_4)_2B_4O_7 \cdot 4H_2O$ per 1000 gallons of water. It is noted that borate ion compounds other than ammonium borate can be utilized to complex the gel, for example, borax $(Na_2B_4O_7 \cdot 10h_2O)$ and mixtures of borax and ammonium chloride can be utilized as the complexer. In addition, the complexed gels contain a breaker. Any suitable breaker can be utilized which will result in a degradation of the viscosity of the gel within any desired time, for example, from about 3 to about 24 hours after the gel is formed. It is preferred that a sufficient quantity of the breaker or breakers be utilized which will break the complexed gel to a viscosity of 10 centipoise or less within 24 hours. The breaker can comprise the water soluble persulfates such as ammonium persulfate, potassium persulfate and sodium persulfate, flake or granular organic acids, such as flake benzoic acid, flake phthalic anhydride, and the like, or enzymes, or combinations thereof. The most preferred breaker system used by Applicants include enzymes and/or about 0.5 wt. % of potassium persulfate $(K_2S_2O_8)$ based upon the weight of gum within the Bingham plastic fluid. Furthermore, it is preferred that the Bingham plastic fluid used in the scope of the subject invention such as the above described complexed gels of guar gum or locust bean gum or the like contain a conventional proppant such as sand. Generally, from about 1 to about 14 and preferably from about 1 to about 8 lbs. of proppant per gallon of the fluid can be used in the scope of the subject invention. The proppant not only functions in the Bingham plastic fluid in a conventional manner to prevent a fracture from completely closing but also functions as a weighting agent for the Bingham plastic fluid which is beneficial, especially with the preferred embodiment set forth above of the subject invention. In essence, an increased pressure drop and resulting overpressure of the formation will occur while developing sufficient pressure to overcome the inertia of the proppant within the fluid.

It is noted, that most Bingham plastic fluids do not conform exactly to the idealogical Bingham plastic model, but if a fluid conforms to the basic Bingham plastic model at shear rates between about 0 sec.$^{-1}$ to about 300 sec.$^{-1}$, and it is compatible with the formation and well treating environment, and can be easily degraded in the formation, it can be used in the scope of the subject invention. Other specific Bingham plastic fluids that can be used in the scope of this invention include certain water-in-oil emulsions. Generally, the aqueous phase of such emulsions can contain a substantial portion of acid which will effect a further acidizing treatment on a formation such as a limestone formation. The aqueous phase of such emulsions can be as high as about 90 wt % thereof with the oil phases of about 10 wt % thereof and the aqueous phase of such emulsions can be as low as about 80 wt % thereof whereas the oil phase can be as high as about 20 wt % thereof. Any emulsifier can be used which is capable of forming a water-in-oil emulsion. Generally, from about 10 to 20 gallons of emulsifier per 1000 gallons of emulsion can be utilized. Suitable such emulsifiers include the compositions sold under the marks AQUET 6896 and AQUET X-28 by Aquaness Chemical Co., Houston, Texas.

Furthermore, it is within the scope of the subject invention to pump a gellable fluid in non-Bingham plastic state to the formation to be treated and thereafter allow the material to gel and/or complex and form a Bingham plastic fluid and thereafter pump the material into the formation. For example, a delayed action type complexer that is time and temperature dependent can be added to an aqueous gum gel containing a complexer. Thus, the Bingham plastic fluid will be formed in situ in the formation. Furthermore, it is within the scope of the subject invention to pump such a material in a non-Bingham plastic state actually into fractures in the formation through the full length of the fracture and while the pressure is maintained on the fluid allowing it to set to form the Bingham plastic material and thereafter relieve pressure from the formation. The pressure can be reapplied to the formation and pumping pressure started within the scope of the preferred embodiment of the subject invention. Thus, when operating in this manner, the fluid can be pumped through the pumping equipment and casing leading to the bottom of the well bore while in a non-Bingham state and with a minimum of friction loss.

The following examples are presented to better facilitate the understanding of the subject invention but are not intended to limit the scope thereof.

EXAMPLE 1

In this example, a newly completed well was treated with the preferred embodiment of the subject invention. The well was perforated with 85 perforations between 6840 and 7308 feet. The Bingham plastic fluid used to treat the well was formed by initially making a gel of guar gum and water which had a proportion of 80 lbs. of guar gum per 1000 gallons of water. The guar gum had been preblended with enzyme breaker and 0.5 wt % of potassium persulfate breaker. Next, 3 pounds per gallon of the gel of 10–20 mesh (U.S. Standard) frac sand were admixed into the guar gum gel. Following this, $(NH_4)_2B_4O_7.4H_2O$ was added in the gel in a quantity of 8 lbs. per 1000 gallons of gel to form the Bingham plastic fluid. The fractioning operation in the scope of the preferred embodiment of the subject invention was carried out by initially pumping 1500 barrels of water into the formation at fracture pressure followed contiguously by a first stage of 5000 gallons of the above described Bingham plastic fluid which in turn was followed contiguously by 250 barrels of water to assure that the entire Bingham stage was pumped completely into the formation. Next, the pumping operation was stopped and the pressure relieved from the formation for 5 minutes. Thereafter, a stage of 2000 barrels of water was pumped into the formation followed contiguously by a second stage of 5000 gallons of the above described Bingham plastic fluid which in turn was followed contiguously by another 309 barrels of water to assure that the second stage of Bingham plastic fluid was completely pumped into the formation. At this time, the pump was again stopped and the pressure relieved from the formation for 5 minutes. Next, another 2000 barrels of water was pumped into the formation followed contiguously by a third stage of 5000 gallons of the Bingham plastic fluid which in turn was followed contiguously by 250 barrels of water to assure that the third stage of Bingham fluid was completely pumped into the formation. The pump was again stopped and the pressure relieved from the formation for 5 minutes. After this, another 2000 barrels of water was pumped into the formation followed contiguously by a fourth stage of 5000 gallons of the Bingham plastic fluid which was again followed contiguously by 250 barrels of water to assure that the fourth stage of Bingham plastic fluid was pumped into the formation. The pump was again stopped and the pressure relieved from the formation for 5 minutes. Thereafter, 2100 barrels of water was pumped into the formation. The well was allowed to set for about 12 hours during which the enzyme and potassium persulfate broke the viscosity of the Bingham plastic fluid and it flowed back to the well bore. This fracturing operation resulted in a well production of 260 barrels of oil per day and 600,000 cubic feet of natural gas per day with a casing pressure of 900 psi and a flowing tubing pressure of 1600 psi on a 16/64 choke. This was a substantial improvement over other wells in the same area which were fractured with conventional techniques. Typical of such newly fractured wells produce about 100 barrels of oil per day and about 200,000 cubic feet of gas per day.

EXAMPLE 2

In this example, a well was perforated with 79 perforations between 7220 and 7450 feet. Thereafter, a continuous fracturing operation was carried out which included the use of a Bingham fluid containing 80 lbs. per 1000 gallons of water of the guar gum containing the breaker system as described in Example 1, 8 lbs. of $(NH_4)_2B_4O_7.4H_2O$ per 1000 gallons of water, and 2 lbs. per gallon of 10–20 mesh (U.S. Standard) of frac sand. The fracturing operation was carried out continuously by initially pumping 4000 gallons of 7.5% by weight hydrochloric acid aqueous solution followed by 2500 barrels of fresh water which was followed contiguously by 10,000 gallons of the above described Bingham plastic fluid which in turn was followed by 2500 barrels of fresh water. The well was allowed to set for about 12 hours during which time the viscosity of the Bingham plastic fluid broke which allowed it to flow back to the well bore. The lower zone in this well was isolated by a mechanical device and thereafter an upper zone in this well was perforated with 65 perforations between 6998–7170 feet and was treated exactly as described above. The results of treating this well were exceptionally good for the area. More specifically, the well treating results exceeded those results which were obtained by conventional well fracturing processes.

The above two Examples were exemplary of treatment of 30 wells within a particular petroleum producing zone. Of the 30 wells that were treated, 12 treatments have produced response much better than would be expected based upon the results of conventional fracturing processes. In other words, these 12 treatments were in old areas and the potentials obtained were better than the results obtained from the original wells in the area, and in some cases the reservoir pressure was higher indicating that some untapped portion of the reservoir was opened. About 9 of the wells were better than average and 10 wells were only about average. The best results were obtained in areas where natural parallel fractures were prevalent.

While this invention has been described in relation to its preferred embodiments, it is to be understood that various modifications thereof will now be apparent to one skilled in the art from reading this specification and it is intended to cover such modifications as fall within the scope of the appended claims.

We claim:

1. A method of treating a fractured subsurface formation traversed by a well bore to increase its permeability comprising:
    a. pumping a Bingham plastic fluid into said well bore at a pressure such that it enters a fracture of said formation;
    b. relieving pumping pressure on said Bingham plastic fluid after it is positioned within said fracture such that the pumping pressure on said Bingham plastic fluid is less than the fracture pressure of said formation; and thereafter
    c. reapplying pumping pressure on said Bingham plastic fluid and said formation which is greater than said fracture pressure of said formation.

2. The method of claim 1 further comprising:
a. pumping a second quantity of Bingham plastic fluid into said well bore at a pressure such that it enters a fracture of said formation;
b. discontinuing said pumping pressure on said second quantity of Bingham plastic fluid after it is contained within said fracture; and thereafter
c. reapplying pumping pressure on said Bingham plastic fluid and said formation which is greater than said fracture pressure.

3. The method of claim 2 wherein a stage of a non-Bingham plastic fluid is pumped into said formation through said well bore between the pumping of the first quantity of Bingham plastic fluid and the said second quantity of Bingham plastic fluid.

4. The method of claim 1 wherein said Bingham plastic fluid comprises an aqueous fluid containing from about 40 to about 100 pounds per 1000 gallons of water with an organic compound selected from guar gum, locust bean gum and derivatives thereof and complexed with borate ions.

5. The method of claim 4 wherein said Bingham plastic fluid comprises from about 60 to about 80 pounds of guar gum per 1000 gallons of water which has been complexed with from about 6 to about 10 pounds of $(NH_4)_2B_4O_7 \cdot 4H_2O$ per 1000 gallons of water.

6. The method of claim 4 wherein said Bingham plastic fluid further comprises an effective amount of a breaker which will degrade said Bingham plastic fluid to a material which does not have Bingham plastic fluid properties after said reapplying of said pumping pressure.

7. The method of claim 6 wherein said Bingham plastic fluid further comprises from about 1 to about 14 pounds of a propping agent per gallon thereof.

8. The method of claim 7 wherein said Bingham plastic fluid contains from about 1 to about 8 pounds of a propping agent per gallon thereof.

9. A method of fracturing a subsurface formation traversed by a well bore comprising:
a. pumping a hydraulic fracture fluid into said formation from said well bore at a sufficient pressure to fracture said formation;
b. pumping a Bingham plastic fluid into said fracture from said well bore;
c. relieving pumping pressure on said Bingham plastic fluid after it is positioned within said fracture such that the pumping pressure on said Bingham plastic fluid is less than the pressure required to form said fracture in said formation; and thereafter
d. reapplying pumping pressure on said Bingham plastic fluid and said formation which is greater than the pressure that was required to form said fracture, to thereby increase the permeability of said formation.

10. The method of claim 9 wherein said pumping pressure is reapplied on said formation by pumping a stage of a non-Bingham plastic hydraulic fluid into said formation.

11. The method of claim 10 further comprising:
a. pumping a second quantity of Bingham plastic fluid into said well bore at a pressure such that it enters the fracture of said formation;
b. discontinuing said pumping pressure on said second quantity of Bingham plastic fluid after it is contained within said fracture; and thereafter
c. reapplying pumping pressure on said Bingham plastic fluid and said formation with a fluid which is sufficient to result in a pressure on said formation which is greater than that required to form said fracture.

12. The method of claim 11 wherein said pumping pressure is reapplied on said second quantity of Bingham plastic fluid by pumping a second stage of non-Bingham plastic hydraulic fluid into said formation.

13. The method of claim 9 wherein said Bingham plastic fluid comprises an aqueous fluid containing from about 40 to about 100 pounds per 1000 gallons of water with an organic compound selected from guar gum, locust bean gum and derivatives thereof complexed with borate ions.

14. The method of claim 9 wherein said Bingham plastic fluid comprises from about 60 to about 80 pounds of guar gum per 1000 gallons of water which has been complexed with from about 6 to about 10 pounds of $(NH_4)_2B_4O_7 \cdot 4H_2O$ per 1000 gallons of water.

15. The method of claim 14 wherein said Bingham plastic fluid further comprises an effective amount of a breaker which will degrade said Bingham plastic fluid to a material which does not have Bingham plastic fluid properties after said reapplying of said pumping pressure.

16. The method of claim 15 wherein said Bingham plastic fluid further comprises from about 1 to about 14 pounds of a propping agent per gallon thereof.

17. The method of claim 16 wherein said Bingham plastic fluid contains from about 1 to about 8 pounds of a propping agent per gallon thereof.

18. In a method of treating a subsurface formation traversed by a well bore by passing a fracture fluid therewithin to increase the permeability thereof, the improvement comprising:
pumping a Bingham plastic fluid into a permeable portion of said subsurface formation at a point where said formation is traversed by said well bore and next relieving the externally applied pumping pressure from said formation allowing the pressure within said formation to self equalize, and thereafter reapplying pumping pressure on said Bingham plastic fluid and said formation which is greater than the fracture pressure of said formation.

19. A method of treating a subsurface formation traversed by a well bore to increase its permeability comprising:
a. pumping a Bingham plastic fluid into said well bore at a pressure such that it enters the more permeable portions of said formation which are traversed by said well bore;
b. discontinuing said pumping pressure after said Bingham plastic fluid is positioned within said permeable portions of said formation; and thereafter
c. reapplying pumping pressure on said Bingham plastic fluid and said formation with a fluid which is greater than the pressure initially required to pump said Bingham plastic fluid into said more permeable portions of said formation and thereby result in an increase of permeability of said formation.

20. The method of claim 19 wherein said Bingham plastic fluid comprises an aqueous fluid containing from about 40 to about 100 pounds per 1000 gallons of water with an organic compound selected from guar gum, locust bean gum and derivatives thereof complexed with borate ions.

21. The method of claim 20 wherein said Bingham plastic fluid comprises from about 60 to about 80 pounds of guar gum per 1000 gallons of water which has been complexed with from about 6 to about 10 pounds of $(NH_4)_2B_4O_7 \cdot 4H_2O$ per 1000 gallons of water.

22. The method of claim 21 wherein said Bingham plastic fluid further comprises an effective amount of a breaker which will degrade said Bingham plastic fluid to a material which does not have Bingham plastic fluid properties after said reapplying of said pumping pressure.

23. The method of claim 22 wherein said Bingham plastic fluid further comprises from about 1 to about 14 pounds of a propping agent per gallon thereof.

24. The method of claim 23 wherein said Bingham plastic fluid contains from about 1 to about 8 pounds of a propping agent per gallon thereof.

25. In a method of treating a subsurface formation traversed by a well bore by passing a fracture fluid therewithin and pumping said fracture fluid at a pressure greater than the fracture pressure of said formation for at least one of the following purposes; (1) forming new fractures within the formation, and (2) extending existing fractures within the formation, to thereby increase the permeability of the formation, the improvement comprising:

pumping a Bingham plastic fluid into said formation and continuing said pumping at increasing pressures caused by the friction loss of said Bingham plastic fluid being pumped into said formation until a pumping pressure in excess of the fracture pressure of said formation is obtained and maintaining said pumping at said excess of said fracture pressure to thereby further increase the permeability of said formation.

26. The method of claim 25 wherein said Bingham plastic fluid is pumped into an existing fracture in said formation and thereafter pumped at a pressure in excess of the pressure which was required to initially fracture said formation.

27. The method of claim 25 wherein said Bingham plastic fluid is initially pumped into said formation and causes a fracturing thereof and thereafter it is pumped into said fracture at a pressure in excess of the pressure which was required to initially form said fracture.

28. The method of claim 26 wherein a first stage of a non-Bingham plastic hydraulic fluid is pumped into said formation to fracture the same and thereafter a contiguous stage of said Bingham plastic fluid is pumped into said fracture at said excess of said fracture pressure.

29. The method of claim 28 wherein a second stage of a non-Bingham plastic hydraulic fluid is pumped into said formation behind said first stage of Bingham plastic fluid.

30. The method of claim 25 wherein said Bingham plastic fluid comprises an aqueous fluid containing from about 40 to about 100 pounds per 1000 gallons of water with an organic compound selected from guar gum, locust bean gum and derivatives thereof complexed with borate ions.

31. The method of claim 30 wherein said Bingham plastic fluid comprises from about 60 to about 80 pounds of guar gum per 1000 gallons of water which has been complexed with from about 6 to about 10 pounds of $(NH_4)_2B_4O_7 \cdot 4H_2O$ per 1000 gallons of water.

32. The method of claim 31 wherein said Bingham plastic fluid further comprises an effecitve amount of a breaker which will degrade said Bingham plastic fluid to a material which does not have Bingham plastic fluid properties after said reapplying of said pumping pressure.

33. The method of claim 32 wherein said Bingham plastic fluid further comprises from about 1 to about 14 pounds of a propping agent per gallon thereof.

34. The method of claim 33 wherein said Bingham plastic fluid contains from about 1 to about 8 pounds of a propping agent per gallon thereof.

* * * * *